3,268,461
PRINTING INK VEHICLES
Norman A. Jacobson, Racine, Wis., assignor to
S. C. Johnson & Son, Inc., Racine, Wis.
No Drawing. Filed Mar. 12, 1962, Ser. No. 179,255
3 Claims. (Cl. 260—18)

This invention relates to improved printing ink vehicles, and more particularly to alcohol soluble resinous ink vehicles especially suitable for use in flexographic inks. The alcohol soluble resins are 4,4-bis(hydroxyaryl)pentanoic acid terminated polyamides.

In the formulation of printing inks which comprise a vehicle, or carrying agent, and colorant, it is necessary in general that the ingredients be completely compatible with one another. Further, the ink must adhere to the surface being printed, possess high gloss and provide a hard tact-free surface. In addition to these general requirements, the several distinct printing systems including (1) letter press or relief printing, in which the type or illustrations are above the surface to receive the ink from the distributing rollers, (2) lithography, in which ink is transferred from a level or plane surface, (3) intaglio, in which ink is transferred from a depressed surface (includes rotogravure, gravure, copper plate pressing, steel dye embossing, and metal etchings), and (4) silk screen, in which a roller squeezes ink through a piece of silk stretched on a frame to paper or a card underneath the frame, require unique and varying characteristics.

Flexographic inks which constitute a special class of printing inks are being used increasingly, especially for package wrappings such as foils, transparent plastic films or paper-bag machines. These inks are used on special presses with rubber printing plates and rollers, and thus, demand unique solubility properties since hydrocarbon solvents, commonly employed to dissolve resinous printing ink vehicles, are detrimental to rubber rollers and plates. Therefore, preferably, the materials in the ink, primarily the vehicle, must be soluble and compatible in alcohol solvents. However, it is still necessary that the resinous vehicle impart high gloss, provide a hard tact-free surface and adhere well to the surface being printed.

In the prior art, phenolic and formaldehyde resins have been commonly employed, but in obtaining the necessary gloss and hardness, it has been necessary to use resins not completely soluble in alcohols, requiring the use of minor amounts of hydrocarbon solvents. Such systems materially deteriorate the rubber plates and rollers, thereby increasing production costs due to replacement expenses and the lost time of the presses.

Accordingly, it is an object of the present invention to provide alcohol soluble resinous polyamide ink vehicles, having satisfactory stability, which are particularly suitable for flexographic inks.

It is another object of this invention to provide alcohol soluble resinous polyamide printing ink vehicles possessing improved characteristics such as good color and gloss, good pigment and dye tolerance, and good adhesion to various kinds of surfaces.

It is another object of the instant invention to provide an alcohol soluble resinous ink vehicle having superior qualities for use in inks for printing on synthetic films.

These and other objects of the invention will become more apparent from the following detailed description with particular emphasis being placed on the illustrative examples.

The alcohol soluble resinous ink vehicles of the present invention are relatively low molecular weight polyamides of polyamines and polybasic acids terminated with a 4,4-bis(4-hydroxyphenyl)pentanoic acid. If desired, minor amounts of a modifying monobasic acid can be incorporated to provide additional solubility and flexibility, including the long chain saturated and unsaturated acids. The polyamides, in addition to being completely soluble in alcohol solvents, possess good color, have excellent pigment and dye tolerance characteristics and possess good adhesion to various kinds of surfaces to be printed, especially synthetic films such as cellulose, cellulose acetate, polyethylene, polyvinyl chloride, polypropylene, Saran, Myler, untreated aluminum foil and the like.

The 4,4-bis(hydroxyaryl)pentanoic acid employed in making the novel printing ink vehicles are described in the Alfred R. Bader U.S. Patent No. 2,933,520. In general, operable acids have the following structural formula:

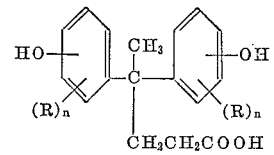

wherein R is a member of the group consisting of chloro, bromo and lower alkyl radicals (for purposes of this specification, lower alkyl embraces alkyl groups of from 1 to about 7 carbon atoms) and $n$ is a number selected from the group consisting of 0, 1 and 2, the hydroxyl groups being attached to the 4 position of the ring structure when $n$ is 0. These acids are conveniently prepared by reacting levulinic acid and a suitable phenol in the presence of a mineral acid with the condensation occurring through the keto group of the levulinic acid. Other methods can be employed.

The polybasic acids suitable for use in preparing the bisphenolic acid terminated polyamides are exemplified by phthalic anhydride, maleic anhydride, succinic anhydride and their corresponding acids, aconitic acid, azelaic acid, sebacic acid, malonic acid, fumaric acid, sorbic acid and endomethylene tetrahydrophthalic acid. Another class of dibasic acid and probably the most desirable are the dimerized vegetable oil fatty acids which are essentially 36 carbon atom aliphatic dicarboxylic acids produced by the polymerization of unsaturated, 18 carbon atom drying oil acids. These dimer acids impart excellent flexibility characteristics to the ink vehicles. By judicious selection of the acid, variations in the properties of the final product are obtained.

The polyamines which are operable include the aliphatic or aromatic compounds, substituted with other functional groups or unsubstituted. It is necessary that the amines used contain at least two primary or secondary amino groups. The substituted materials contemplated for use are those which are free from functional groups which will interfere with the reaction of the bisphenolic acid through its carboxyl group. Thus, polyamines containing a carboxylic acid such as diaminobenzoic acid are not desirable since the amidification of the bisphenolic acid would be competing with the amidification of the benzoic acid carboxyl group. Amino ethers or hydroxyl amines are examples of suitable substituted compounds.

Operable aliphatic amines are either the low or high molecular weight compounds. Illustrative low molecular weight polyamines include ethylene diamine, triethylene diamine, propylene diamine, 1,2 tetramethylene diamine, hexamethylene diamine, diethylene triamine, triethylene tetraamine, and tetraethylene pentaamine. The higher molecular weight polyamines are usually prepared from polymerized fatty acids, such as linseed oil fatty acid, or from the higher molecular weight glycols. The dimer acids of long chain fatty acids, such as soya bean and linseed oil are probably the most important of the higher molecular weight polyacids. Aromatic polyamines which can be used include the mononuclear, non-fused polynuclear, and fused polynuclear polyamines. Illustrative compounds are paraphenylene diamine, aminobenzylphenylene amine, tri(para-amino phenyl) methane, diaminodiphenyl amine, toluene-2,5-diamine, and 3,3' bitoluene-4,4'-diamine.

The modifying acid which may be advantageously incorporated in the resinous ink vehicles for imparting increased solubility, solution stability and drying characteristics include aromatic acids such as benzoic, salicylic acid, p-hydroxy benzoic acid.

The polyamides of this invention are conveniently prepared by methods of amidification known in the art. In general, the polyamides are prepared by heating the polyamine and dibasic acid to obtain a low acid value and then add the bisphenolic acid and continue the reaction. However, the order of addition of the various ingredients, i.e., the polyamine, polybasic acid, bisphenolic acid and modifying organic acid, can be varied. It is sometimes advantageous to vary the order of reactants to obtain optimum results with a particular combination of ingredients. In certain instances, it may be desirable to use a simple ester of the desired acid, depending usually upon which material is most economically available. In instances where the polyamine is sufficiently high boiling so as not to volatilize during heat treatment, the amidification is conveniently carried out by heating the polyamine directly with the acid or its ester at temperatures of from about 120–250° C. In such reactions, the removal of water or alcohol formed during amidification can be facilitated by azeotropic distillation with a hydrocarbon solvent or by passing a stream of inert gas over the reaction mixture.

The ratio of the polycarboxylic acid, polyamine and 4,4-bis(4-hydroxyphenyl)pentanoic acid can be varied over a relatively wide range depending upon the degree of hardness needed in the end product, it only being necessary that the resin remain alcohol soluble. Thus, the ratio of acid to polyamine can be adjusted so that substantially equivalent amounts of carboxylic group and amino groups are present in the mixture. Such combinations have been found to be particularly suitable. It has been found that the preferred compounds are those where the moiety of the polycarboxylic acid occurs in the polymer chain from about 1–10 times. The 4,4-bis(hydroxyaryl)pentanoic acid content should be sufficient so that the desirable properties in the final product are achieved. Thus, the polybasic acid will vary from about 1 to about 10 mols as the polyamine varies from about 2 to about 11 mols and the 4,4-bis(4-hydroxyaryl)pentanoic acid is present in an amount of from about 1 to about 13 mols depending upon the number of free amino groups in the polyamine employed. The molecule can be modified by substituting a long chain monobasic acid for some of the bisphenolic acid to obtain improved flexibility and/or compatibility. The ratio of bis-phenolic acid to modifying monobasic acid should be in the range of from about 1:1 to 5:1, depending upon the characteristics desired in the molecule. The polyamide will have a Durran's softening point of from about 30° C. to about 140° C.

Having described the invention in general terms, the following examples are set forth to more particularly illustrate the preferred embodiments. Examples 1–18 describe the preparation of the bisphenolic terminated polyamides, and Examples 19–21 demonstrate the use of illustrative resins in an ink composition. Softening points were determined by Durran's Mercury Method (Journal of Oil and Color Chemist's Association, 12, 173–175 [1929]). Acid value as used herein represents the number of milligrams of KOH required to neutralize one gram of the sample. Amine value represents the number of milligrams of HCl required to neutralize a one gram sample. The amine and acid values were determined by electrometric titration. Parts are by weight unless specifically otherwise indicated.

Example 1

Three mols ethylene diamine and 2 mols Empol 1022 fatty acid, a C–36 dibasic dimer acid produced by the polymerization of soya fatty acids, having an acid value of 190, saponification value of 185, neutralization equivalent of 290–310, and a viscosity at 25° C. of 10,000 centistokes, marketed by Emery Industries, Inc., were charged to a 3-neck flask fitted with a thermometer, agitator, side arm water trap and condenser. The temperature was raised gradually to 210° C. while flowing inert gas over the reaction mixture. Water of amidification was removed by means of a water trap as it was formed. When the acid value was reduced to approximately 15, 2 mols 4,4-bis(4-hydroxyphenyl)pentanoic acid were added over a period of thirty minutes and the temperature again raised to 210° C. and held a final value of 16.7. The total reaction time was approximately 5 hours. The resultant product had an amine value of 14.2, a softening point of 95° C., and was completely soluble in ethyl and isopropyl alcohol.

Example 2

4.1 mols ethyleen diamine, 3 mols Empol 1022 dimer fatty acid, and 187 ml. xylene were charged to a 3-neck flask equipped with thermometer, agitator, side arm water trap and condenser. The temperature was raised to 200° C. while passing nitrogen gas over the reaction medium to facilitate the removal of water of amidification and xylene as they were formed. When the acid value reached approximately 15, 2 mols 4,4-bis(4-hydroxyphenyl)pentanoic acid were charged to the reaction medium over a total period of 25 minutes, and the temperature again raised to 200° C. The reaction was terminated at an acid value of 5.4. The total reaction time was approximately 12 hours. The final product had an amine value of 2.7, a softening point of 85° C. and was completely soluble in commercial grade ethyl alcohol and isopropanol.

Example 3

4 mols Empol 1022 fatty acids and 5.1 mols ethylene diamine were charged to a 3-neck flask equipped with agitator, thermometer, side arm water trap and condenser. The temperature was raised slowly to 200° C. while passing nitrogen gas over the reaction medium to facilitate water removal. When the acid value was about 3, 1 mol of 4,4-bis(4-hydroxyphenyl)pentanoic acid was added and reaction temperature again raised to 200° C. The reaction was terminated at an acid value of 2.55. The final product had an amine value of 10.2, a softening point of 96° C. and was completely soluble in isopropanol.

Example 4

3 mols diethylene triamine and 2 mols Empol 1022 dimer fatty acid were charged to a 3-neck flask equipped with agitator, thermometer, side arm water trap and condenser. The temperature was raised gradually to 225° C. and maintained until an acid value of approximately 10 was reached. At this time, 4 mols 4,4-bis(4-hydroxyphenyl)pentanoic acid were charged to a reaction vessel over a period of 45 minutes and the temperature again raised to 225° C. and held for a total of 12 hours. The resultant product had an acid value of 7.6, an amine value of 25, a softening point of 105° C. and was completely soluble in commercial grade ethyl alcohol and isopropanol.

Example 5

4 mols diethylene triamine, 3 mols Empol 1022 dimer fatty acid and 4 mols 4,4-bis(4-hydroxyphenyl)pentanoic acid were charged to a 3-neck flask equipped with thermometer, agitator, side arm water trap and condenser. The temperature was raised to 230° C. while passing inert gas over the reaction mixture to facilitate removal of water of amidification. The reaction temperature was maintained for a total of 12 hours. The resultant product had an acid value of 7.2, an amine value of 31, a softening point of 108° C. and was soluble in hot commercial ethyl alcohol and isopropanol.

*Example 6*

2.1 mols ethylene diamine, 1 mol Empol 1022 fatty acid and 2.0 mols 4,4-bis(4-hydroxyphenyl)pentanoic acid were charged to a 3-neck flask equipped with agitator, thermometer, side arm water trap and condenser. The temperature was raised to 210° C. while flowing nitrogen gas over the reaction mixture to facilitate water removal. The reaction time was maintained for a total of 11 hours. The resultant product had an acid value of 25, an amine value of 5, a softening point of 97° C. and was soluble in commercial grade ethyl alcohol.

*Example 7*

3.1 mols ethylene diamine, 2 mols Empol 1022 fatty acids and 2.0 mols 4,4-bis(4-hydroxyphenyl)pentanoic acid were charged to a 3-neck flask equipped with thermometer, agitator, side arm water trap and condenser. The temperature was raised to 195° C. while flowing an inert gas over the reaction medium to facilitate the removal of water of amidification. The total time was 8 hours. The resultant product had an acid value of 10.9, an amine value of 11.5, a softening point of 100 and was soluble in commercial grade ethyl alcohol.

*Example 8*

4.1 mols ethylene diamine, 3 mols Empol 1022 and 2.0 mols 4,4-bis(4-hydroxyphenyl)pentanoic acid were charged to a 3-neck flask equipped with agitator, thermometer, side arm water trap and condenser. The temperature was raised to 195° C. while flowing nitrogen gas over the reaction medium. The temperature was maintained for a period of 8 hours. The resultant product had an acid value of 8.6, an amine value of 5.4, a softening point of 92° C. and was completely soluble in commercial grade ethyl alcohol.

*Example 9*

1.0 mol ethylene diamine, 1.0 mol diethylene triamine and 1 mol Empol 1022 fatty acids were charged to a 3-neck flask equipped with thermometer, agitator, side arm water trap and condenser. The temperature was raised to 217° C. while flowing inert gas over the reaction medium to facilitate removal of water of amidification. The temperature was maintained until an acid value of approximately 15 was reached. At this time, 3.0 mols 4,4-bis(4-hydroxyphenyl)pentanoic acid were charged to the reaction vessel over a period of 40 minutes and the temperature again raised to 217° C. The temperature was maintained for a total of 8 hours. The final product had an acid value of 13.4, an amine value of 22.5, a softening point of 107° C. and was completely soluble in commercial grade ethyl alcohol.

*Example 10*

2 mols diethylene triamine, 1 mol Empol 1022 dimer fatty acid, and 4 mols 4,4-bis(4-hydroxyphenyl)pentanoic acid were charged to a 3-neck flask equipped with thermometer, agitator, side arm water trap and condenser. The temperature was raised to 215° C. while flowing an inert gas over the reaction mixture to facilitate removal of water of amidification. The temperature was maintained for a period of 11.5 hours. The resultant product had an acid value of 9.4, an amine value of 26.2, a softening point of 126° C. and was completely soluble in commercial grade ethyl alcohol.

*Example 11*

1.0 mols diethylene triamine, 2 mols ethylene diamine, 2 mols Empol 1022 fatty acid, and 3 mols 4,4-bis(4-hydroxyphenyl)pentanoic acid were charged to a 3-neck flask equipped with agitator, thermometer, side arm water trap and condenser. The temperature was raised to 210° C. while flowing an inert gas over the reaction medium to facilitate removel of water of amidification. The reaction was maintained at this temperature for approximately 11 hours. The polyamide had an acid value of 2.1, an amine value of 13.9, a softening point of 107° C. and was soluble in commercial grade ethyl alcohol.

*Example 12*

2.0 mols diethylene triamine, 1 mol ethylene diamine, and 2 mols Empol 1022 fatty acid were charged to a 3-neck flask equipped with thermometer, agitator, side arm water trap and condenser. The temperature was raised to 215° C. while flowing an inert gas over the reaction mixture to facilitate removal of water of amidification. The temperature was maintained until the reaction charge had an acid value of 15. At this time, 4 mols 4,4-bis(4-hydroxyphenyl)pentanoic acid were charged to the reaction vessel over a period of 50 minutes and the temperature again raised to 215° C. The total reaction time was 15 hours. The resultant product had an acid value of 12, an amine value of 20.3, a softening point of 129 and was completely soluble in commercial grade ethyl alcohol.

*Example 13*

3 mols diethylene triamine, 2 mols Empol 1022 fatty acid, and 5 mols 4,4-bis(4-hydroxyphenyl)pentanoic acid were charged to a 3-neck flask equipped with thermometer, agitator, side arm water trap and condenser. The temperature was raised to 205° C. while flowing an inert gas over the reaction medium to facilitate removal of water amidification. The reaction temperature was maintained for a total of 12 hours. The polyamide had an acid value of 17.7, an amine value of 27.8, a melting point of 132° C. and was soluble in commercial grade ethyl alcohol.

*Example 14*

6.25 mols ethylene diamine and 5.0 mols Empol 1022 fatty acids were charged to a 3-neck flask equipped with thermometer, agitator, side arm water trap and condenser. The temperature was raised to 200° C. while flowing an inert gas over the reaction medium to facilitate removal of water of amidification. The temperature was maintained until an acid value of approximately 3 was reached. At this time, 1 mol 4,4-bis(4-hydroxyphenyl)pentanoic acid was charged to the flask and the temperature again raised to 200° C. The reaction was terminated at an acid value of 1.4. The final product had an amine value of 14.5, a softening point of 96° C. and was completely soluble in isopropanol.

*Example 15*

6.25 mols ethylene diamine and 5.0 mols Empol 1022 fatty acids were charged to a 3-neck flask equipped with thermometer, agitator, side arm water trap and condenser. The temperature was raised to 200° C. while flowing an inert gas over the reaction medium to facilitate removal of the water of amidification. The temperature was maintained until an acid value of approximately 10 was reached. At this time, 2 mols 4,4-bis(4-hydroxyphenyl)pentanoic acid was charged to the flask over a period of 1 hour. The temperature was again raised to 200° C. and held until an acid value of 3.87 was obtained. The final product had an amine value of 5.2, a softening point of 92° C. and was soluble in isopropanol.

*Example 16*

7.4 mols ethylene diamine and 6 mols Empol 1022 fatty acids were charged to a 3-neck flask equipped with thermometer, agitator, side arm water trap and condenser. The temperature was raised to 200° C. while flowing an inert gas over the reaction medium to facilitate removal of water of amidification. The temperature was maintained until an acid value of approximately 10 was reached. At this time, 1 mol of 4,4-bis(4-hydroxyphenyl)

pentanoic acid was added. The temperature was again raised to 200° C. and held until an acid value of 3.35 was obtained. The final product had an amine value of 11.6, a softening point of 96° C. and was soluble in isopropanol.

*Example 17*

7.5 mols ethylene diamine and 6 mols of Empol 1022 fatty acid were charged to a 3-neck flask equipped with thermometer, agitator, side arm water trap and condenser. The temperature was raised to 200° C. while flowing an inert gas over the reaction medium to facilitate removal of water of amidification. The temperature was maintained until an acid value of approximately 10 was reached. At this time, 2 mols of 4,4-bis(4-hydroxyphenyl)pentanoic acid were charged to the flask over a period of about 1 hour. The temperature was again raised to 200° C. and held until an acid value of 3.9 was obtained. The final product had an amine value of 3.1, a softening point of 94° C. and was soluble in isopropanol.

*Example 18*

1 mol diethylene triamine, 6 mols ethylene diamine and 6 mols of Empol 1022 dimer fatty acids were charged to a 3-neck flask equipped with thermometer, agitator, side arm water trap and condenser. The temperature was raised to 200° C. while flowing an inert gas over the reaction medium to facilitate removal of water of amidification. The temperature was maintained until an acid value of approximately 10 was reached. At this time, 1 mol coconut fatty acids (Hydrofol 631, Archer Daniel Midland) and 2 mols of 4,4-bis(4-hydroxyphenyl)pentanoic acid were added to the flask over a period of about 1 hour. The temperature was again raised to 200° C. and held until an acid value of 11.7 was reached. The final product had an amine value of 9.8, a softening point of 87° C. and was soluble in isopropanol.

In Examples 1–18, the 4,4-bis(4-hydroxyphenyl)pentanoic acid can be replaced by other bisphenolic acids containing chloro, bromo, nitro and 1 to 7 carbon atom alkyl groups including 4,4-bis(4-hydroxy-3-ethylphenyl)pentanoic acid,
4,4-bis(4-hydroxy-3,5-di-isopropylphenyl)pentanoic acid,
4,4-bis(4-hydroxy-2-ethylphenyl)pentanoic acid,
4,4-bis(4-hydroxy-2,5-diamylphenyl)pentanonic acid,
4,4-bis(2-hydroxy-3-butylphenyl)pentanoic acid,
4,4-bis(2-hydroxy-3-methyl-5-chlorophenyl)pentanoic acid,
4,4-bis(4-hydroxy-3,5-dibromophenyl)pentanoic acid,
4,4-bis(4-hydroxy-3-nitrophenyl)pentanoic acid,
4,4-bis(2-hydroxy-3-nitro-5-methylphenyl)pentanoic acid,
4,4-bis(4-hydroxy-3-methyl-5-chlorophenyl)pentanoic acid,
4,4-bis(4-hydroxy-3-amylphenyl)pentanoic acid,
4,4-bis(4-hydroxy-3-chlorophenyl)pentanoic acid,
4-(4-hydroxyphenyl)-4-(4-hydroxy-3-amylphenyl)pentanoic acid,
4-(4-hydroxyphenyl)-4-(2-hydroxy-4-chlorophenyl)pentanoic acid,
4-(4-hydroxyphenyl)-4-(4-hydroxy-3,5-dibromophenyl)pentanoic acid,
4-(4-hydroxyphenyl)-4-(2-hydroxy-4-nitrophenyl)pentanoic acid,
4-(4-hydroxyphenyl)-4-(4-hydroxy-3-sulfophenyl)pentanoic acid, and
4-(4-hydroxyphenyl)-4-(2-hydroxy-3,5-dimethylphenyl)pentanoic acid.

In Examples 1–18, the polybasic acid can be partially replaced by other polybasic acids including adipic acid, fumaric acid, sebacic acid, azelaic acid and phthalic anhydride. Satisfactory compositions can also be prepared by replacing the dimer acid employed in the preceding examples with dimer acids obtained from dehydrated castor oil, linseed oil and cottonseed oil.

The polyamine can be replaced by other polyamines including 1,2 tetramethylene diamine, propylene diamine, hexa-methylene diamine, para-phenylene diamine and toluene 2,4 diamine.

In Examples 1–18, part of the 4,4-bis(4-hydroxyphenyl)pentanoic acid can be replaced by a modifying monobasic acid including salicylic acid, p-hydroxy benzoic acid or hydroxy acetic acid.

*Example 19*

The polyamide prepared in Example 2 was dissolved in ethyl alcohol at 40% non-volatile to give a free flowing liquid. To 52 parts of this solution was added 20 parts of phthalocyanine blue pigment and 28 parts ethyl alcohol. The mixture was ground in a steel ball mill for 16 hours, resulting in a uniform blue dispersion. When printed on various types of paper and synthetic films such as polyethylene, aluminum foil, polypropylene, Mylar and "K" film, the ink dried rapidly to give a hard, flexible, highly glossy coating which adhered to the above substrates as determined by a pressure sensitive tape test. It did not smudge with vigorous rubbing.

*Example 20*

The polyamide prepared in Example 14 was dissolved in 95% isopropanol at 40% non-volatile to give a free flowing liquid. To 32 parts of the above varnish solution was added 50 parts of molybdate-orange pigment (Imperial Red-Orange X–1939) and 18 parts 95% isopropanol. The mixture was ground in a steel ball mill for 16 hours, resulting in a uniform red-orange colored dispersion. When printed on various types of paper and synthetic films such as polyethylene, polypropylene, Saran coated cellophane ("K" film), aluminum foil and Mylar, the ink dried rapidly to give a hard, flexible highly glossy coating. All passed the adhesion test as determined with pressure sensitive tape. The films did not smudge with vigorous rubbing.

*Example 21*

The polyamide resin prepared in Example 16 was dissolved in 95% isopropanol at 40% non-volatile to give a free flowing liquid. To 520 parts of this varnish solution was added 200 parts titanium dioxide pigment (Cyanamid Unitane OR–450) and 280 parts 95% isopropanol. The mixture was ground in a steel ball mill for 16 hours, resulting in a uniform white dispersion. When printed on various substrates such as paper, polyethylene, aluminum foil, etc., the ink dried rapidly to give a flexible, glossy coating with excellent adhesion and flexibility.

In addition to being particularly well suited for flexographic inks, the instant resinous vehicles are also advantageously employed in other printing ink compositions. Thus, it has been found that the resins have excellent properties as vehicles for steam-set, lithographic and heat-set inks. Although the resins are particularly desirable due to their solubility characteristics in alcohols, they can be dissolved in other commonly employed ink solvents including dimethyl phthalate, diethylene glycol, a mixture of dimethyl phthalate and diethylene glycol, butyl carbitol, and butyl carbitol acetate. These solvents do not evaporate to an excessive degree on the printing press, yet will evaporate sufficiently fast when the ink is spread thinly on paper or other printable surfaces.

The instant polyamide printing ink vehicles can be used as the sole resinous vehicle or in combination with other synthetic resins including polyvinyl chloride, polyvinyl butyral, ethyl cellulose, nitro cellulose, acrylate resins such as Acryloid B–72, phenol formaldehyde and urea formaldehyde resins. By judicious selection of the dicarboxylic acid, polyamine, modifying acid and 4,4-bis(hydroxyaryl)pentanoic acid, the polyamide molecule can be tailored to be compatible with most resin systems. The resin can also be employed with dyes, pigments, fillers and plasticizers depending on the end use and particular properties desired in the end composition.

It should be appreciated that the invention is not to be construed as being limited by the illustrative examples. It is possible to produce still other embodiments without departing from the inventive concept herein disclosed.

It is claimed and desired to secure by Letters Patent:

1. In a printing ink formulation comprising, in combination, coloring matter and a resinous vehicle compatible with said coloring matter, the improvement wherein the resinous vehicle comprises an alcohol soluble 4,4-bis(hydroxyaryl)pentanoic acid terminated polyamide, said polyamide being the reaction product obtained by heating a polyamine having at least two amino groups each having at least one amino hydrogen with said amino groups being the sole amide forming groups, a carboxylic acid containing two and only two carboxyl groups, said carboxyl groups being the sole amide forming groups and a 4,4-bis(hydroxyaryl)pentanoic acid having the general structure:

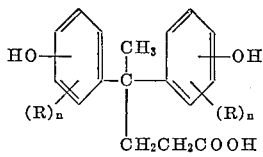

wherein R is a member of the group consisting of chloro, bromo and lower alkyl radicals and $n$ is a number selected from the group consisting of 0, 1 and 2, the hydroxyl groups being attached to the 4 position of the ring structure when $n$ is 0.

2. The printing ink of claim 1 wherein the 4,4-bis(hydroxyaryl)pentanoic acid is 4,4-bis(4-hydroxyphenyl)pentanoic acid.

3. In a printing ink formulation comprising, in combination, coloring matter and a resinous vehicle compatible with said coloring matter, the improvement wherein the resinous vehicle comprises an alcohol soluble 4,4-bis-(hydroxyphenyl)pentanoic acid terminated polyamide, said polyamide being the reaction product obtained by heating an aliphatic polyamine having at least two amino groups each containing at least one amino hydrogen, the hydrogen atoms of said amino groups being the sole amide forming groups, a dimerized vegetable oil fatty acid containing two and only two carboxyl groups which are the sole amide forming groups and 4,4-bis(4-hydroxyphenyl)pentanoic acid.

References Cited by the Examiner
UNITED STATES PATENTS
2,907,728  10/1959  Greenlee _____ 260—559 X CHARLES B. PARKER, *Primary Examiner.*

J. P. BRUST, R. V. HINES, *Assistant Examiners.*